United States Patent [19]

Beck

[11] Patent Number: 5,443,309

[45] Date of Patent: Aug. 22, 1995

[54] SOLENOID VALVE, IN PARTICULAR FOR HYDRAULIC BRAKE SYSTEMS WITH SLIP CONTROL

[75] Inventor: Erhard Beck, Weilburg, Germany

[73] Assignee: ITT Automotive Europe GmbH, Frankfurt, Germany

[21] Appl. No.: 211,911

[22] PCT Filed: Sep. 30, 1992

[86] PCT No.: PCT/EP92/02257

§ 371 Date: Apr. 21, 1994

§ 102(e) Date: Apr. 21, 1994

[87] PCT Pub. No.: WO93/08051

PCT Pub. Date: Apr. 29, 1993

[30] Foreign Application Priority Data

Oct. 25, 1991 [DE] Germany .............. 41 35 232.7

[51] Int. Cl.⁶ .............. B60T 8/36; F16K 31/06; F16K 47/00
[52] U.S. Cl. .............. 303/119.2; 251/122; 251/129.08
[58] Field of Search .............. 303/119.2, 119.1, 900, 303/901, 15, 113.1, 113.2, 116.1, 116.2; 137/596.17, 529; 251/129.02, 129.01, 129.05, 129.08, 129.15, 129.18, 129.2, 129.22, 122, 83; 188/181 A

[56] References Cited

U.S. PATENT DOCUMENTS

| | | | |
|---|---|---|---|
| 2,516,825 | 7/1950 | Hejduk et al. .............. | 251/122 |
| 2,649,273 | 8/1953 | Honegger .............. | 251/122 X |
| 3,073,349 | 1/1963 | Mitchell . | |
| 3,187,775 | 6/1965 | Pinnell .............. | 251/122 X |
| 3,431,028 | 3/1969 | Yoder .............. | 251/129.02 X |
| 3,605,813 | 9/1971 | Nakano et al. .............. | 303/119.2 X |
| 3,907,379 | 9/1975 | Lawson . | |
| 4,141,597 | 2/1979 | Sato et al. .............. | 303/119.1 |
| 4,155,604 | 5/1979 | Fenart .............. | 303/119.2 |
| 4,793,589 | 12/1988 | Eldredge et al. .............. | 251/122 |
| 5,020,864 | 6/1991 | Tanaka .............. | 303/900 |
| 5,318,066 | 6/1994 | Burgdorf et al. .............. | 137/529 |
| 5,333,946 | 8/1994 | Goossens et al. .............. | 303/119.2 |

FOREIGN PATENT DOCUMENTS

| | | |
|---|---|---|
| 0181643A2 | 5/1986 | European Pat. Off. . |
| 0181643B1 | 5/1986 | European Pat. Off. . |
| 0457244 | 11/1991 | European Pat. Off. . |
| 1043738 | 11/1958 | Germany . |
| 3337259 | 4/1985 | Germany . |
| 3543882 | 6/1987 | Germany .............. 303/119.2 |
| 3701019 | 7/1988 | Germany . |
| 3925794 | 2/1991 | Germany . |
| 4002865 | 8/1991 | Germany . |
| 4030571 | 4/1992 | Germany . |
| 88/03102 | 5/1988 | WIPO . |
| 91/04181 | 4/1991 | WIPO . |
| 92/04214 | 3/1992 | WIPO . |

Primary Examiner—Douglas C. Butler
Attorney, Agent, or Firm—Ratner & Prestia

[57] ABSTRACT

A solenoid valve which has a valve-dome-enclosed armature which, in dependence on a current energized magnet coil arranged on the valve dome, performs a stroke motion, so that a valve tappet movable with the armature and partially surrounded by a magnet core acts on a valve seat in a valve housing. For the purpose of damping valve operating noises that possibly might form, at least one recess of defined length, width and depth is arranged on a circumferential surface of the valve tappet which is remote from the armature, with the recess partially extending in the longitudinal direction.

2 Claims, 1 Drawing Sheet

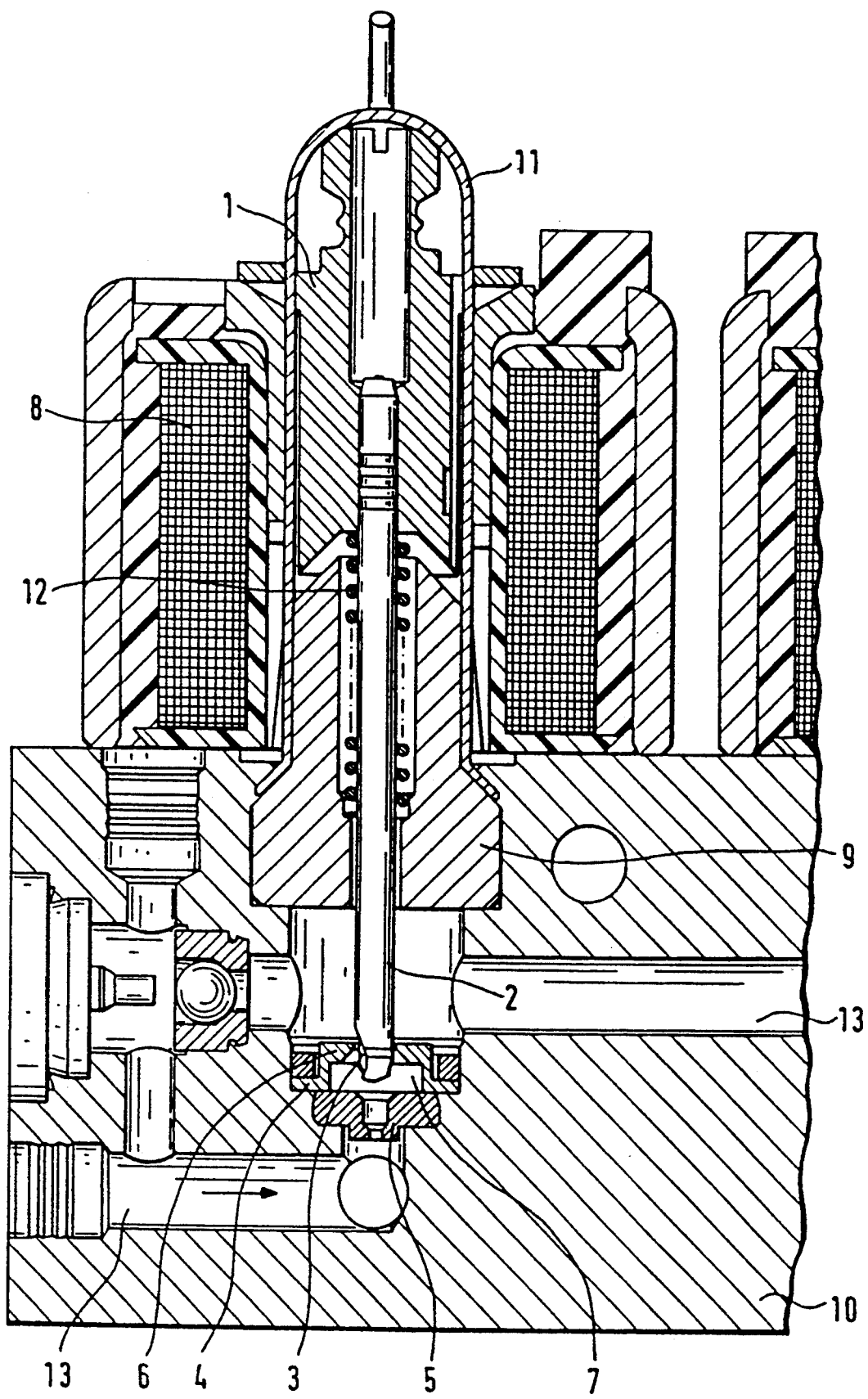

SOLENOID VALVE, IN PARTICULAR FOR HYDRAULIC BRAKE SYSTEMS WITH SLIP CONTROL

BACKGROUND OF THE INVENTION

This invention relates to a solenoid valve, in particular for hydraulic brake systems with slip control.

There are many practical applications for such conventional, well-known valves for controlling the flow of fluids in slip-controlled hydraulic brake systems.

German Patent Application No. P 37 01 019.0 discloses a solenoid valve for a slip-controlled hydraulic brake system consisting of a valve seat which receives a valve tappet excitable by a solenoid and guided in an axially movable manner within a valve housing and having an annular flow cross-section controllably arranged between the valve tappet and the valve seat and communicating with the pressure medium channels which project into the valve housing. In order to control all the brake circuits, several valves are combined advantageously in a valve block housing, so that a space-saving positioning of all solenoid valves is ensured in an economical, low-cost manner.

A shortcoming of this known valve design is its noise behavior during the operating phases of the valve which is caused by the non-uniform flow behavior and, hence, by the discontinuous flow bypassing the valve closure member because of the binary valve operating positions.

In order to reduce the development of noise and, hence, the transmission of sounds, at present, considerable passive, as well as active, noise dampening efforts have been tried. However, all such known efforts have involved considerable cost and the results have required optimizing.

SUMMARY OF THE INVENTION

It is, thus, an object of the present invention to provide an improved solenoid valve of the type referred to above having a relatively simple design and a considerable reduction of the noise behavior during the valve operating phases, while avoiding the aforementioned disadvantages as well as simultaneously ensuring operational reliability.

According to the present invention, this object is achieved by providing at least one recess of defined length, width and depth on the circumferential surface of the valve tappet which is remote from the armature, the recess partially extending in the longitudinal direction.

Other characteristics and advantages of the present invention will be explained in more detail, with reference being made to the drawing.

BRIEF DESCRIPTION OF THE DRAWING

The single figure is a cross-sectional view of a solenoid valve constructed in accordance with the present invention.

DETAILED DESCRIPTION OF THE INVENTION

The drawing shows the cross-section of a solenoid valve, constructed in accordance with the present invention, which is open in the electromagnetically non-excited basic position. The valve housing 10 is preferably manufactured to receive further solenoid valves in valve-block-type construction. In particular, in the drawing, a magnet core 9 is illustrated which is covered with a valve sleeve 11 in the valve housing 10 and which has a truncated-cone-type taper facing the armature 1. Adapted to the contour of the truncated cone of the magnet core, the front face of the armature 1 which faces the magnet core 9 has a funnel-shaped cavity. In the illustrated open, currentless operating position of the solenoid valve, a compression spring 12 holds the armature 1 spaced from the magnet core 9 so as to define an air gap. An armature-side valve tappet 2 extends through the compression spring 12 and, thus, simultaneously provides support against buckling of individual coils of the spring. The portion of the valve tappet 2 which extends away from the armature 1 extends coaxially through the magnet core 9 into a closure damping chamber 7 between a sleeve 4 and a valve seat 5. Situated both below and above the closure damping chamber 7 are the pressure medium channels 13 which are placed in fluid communication by the solenoid valve. The sleeve 4 has a disk-type, cup-shaped housing whose knife-type-taper centering ring 6 can overlap with a notch-type recess 3 provided on the end of the valve tappet 2 remote from armature 1. The particular design of the sleeve 4, on the one hand, ensures a small-tolerance-rated radial play of the valve tappet 2. On the other hand, the illustrated asymmetrical cross-section of the valve opening serves as an orifice in the currentless basic position of the solenoid valve, so that it is possible, for instance, to do without the separately-arranged orifice elements in the valve housing which are used for slip-controlled brake systems.

In the following, the mode of operation of the present invention will be described. In doing so, at first a binary-operation solenoid valve will be described which, different from the proportional valve characteristic illustrated by the drawing, does not have the funnelled or truncated-cone-type design of the armature and magnet core, respectively. Due to the binary operating positions, such conventional solenoid valves cause an unsteady flow variation, the disadvantages of which can be considerably reduced by using the characteristic features described in the following. In the open-flow basic position of the solenoid valve, similar to the proportional solenoid valve shown in the drawing, pressure medium will flow from the first pressure medium channel 13 to the second pressure medium channel 13 via a relatively small asymmetrical valve opening cross-section due to the recess 3. This valve opening cross-section, formed from the notch-type recess 3 on the valve tappet 2 and the knife-type-taper centering ring 6 of the sleeve 4 and provided with a radial play, will serve as an orifice when in use in slip-controlled brake systems. Thus, the separate and costly arrangement of orifice elements in the valve housing 10 is unnecessary. When the magnet coil 8 is excited by a current, the valve opening cross-section will close continuously in dependence on the constructional characteristics (i.e. length, width and depth) of the recess 3 with a defined pressure variation pattern, so that the pressure medium will experience a deceleration with reduced pressure amplitude instead of a pulse-type reduction of the flow variation. Simultaneously, as the valve tappet 2 plunges into the sleeve 4, a hydraulic damping in dependence on the tappet stroke and the tappet cross-section will result because, during the closure of the valve opening cross-section, pressure medium volume will be compressed in the closure damping chamber 7 which, decelerated, will reach the further pressure medium channel 13 and, thus, the pressure medium consumer, such as a wheel brake via the respective reduced valve opening cross-section prevailing during the valve closing motion. Thus, pressure pulses in the pressure medium channels will be avoided which, in particular, appear in binary solenoid valves and which are respectively triggered by the closing and opening pulses.

With corresponding adaptation of the control technology, the design featured by the solenoid valve illustrated by the drawing, with regard to the armature 1 and magnet core 9, will result in a proportional characteristic for the solenoid valve, so that, in correspondence with the afore-described mode of operation of the binary solenoid valve, as an additional distinction, between the valve end positions, there may take place a continuous and, hence, individual control of the tappet stroke and of the volume stream. A current-controlled electric actuation of the proportional magnet with a pulse-width-modulated control signal is particularly suited for these purposes. A further improvement in the noise behavior of known solenoid valves can be achieved by a high-frequency digital actuation of the magnet coil, so that, in addition to the described hydraulic damping, an electric damping will considerably reduce the valve operating noises.

Summarizing, it is pointed out that, without the need of changing the existing valve housing 10, minimal constructional adaptations of the valve tappet 2, the magnet core 9 and the armature 1 will ensure a considerable reduction in the valve noises, particularly so in case of relatively great pressure differences, since undesired pressure peaks will be avoided by the afore-described measures.

LIST OF REFERENCE NUMERALS 1 armature
2 valve tappet
3 recess
4 sleeve
5 valve seat
6 centering ring
7 closure damping chamber
8 magnet coil
9 magnet core
10 valve housing
11 valve dome
12 compression spring
13 pressure medium channel

I claim:
1. A solenoid valve comprising:
   a valve housing having a closure damping chamber and a valve seat in a first end of said closure damping chamber;
   a valve armature disposed within said valve housing and movable along a longitudinal axis;
   a magnet coil surrounding said valve armature for controlling stroke movement of said valve armature along said longitudinal axis;
   a magnet core secured within said valve housing and spaced from said valve armature;
   a valve tappet extending through said magnet core and movable with said valve armature along said longitudinal axis and having:
   (a) an end remote from said valve armature which seats in said valve seat, and
   (b) on a circumferential surface at said end at least one recess in the form of a notch having defined, width and depth extending partially along said longitudinal axis; and
   a cup-shaped sleeve fitted within said valve housing and having a centering ring with a knife-type-taper defining a second end of said closure damping chamber and through which said end of said valve tappet extends with a small radial play between said recess in said valve tappet and said sleeve, said recess in said valve tappet and said centering ring defining a valve-opening orifice.

2. A solenoid valve according to claim 1 wherein a surface of said magnet core facing said valve armature has a truncated-cone-type taper and a surface of said valve armature facing said magnet core has a funnel-shaped cavity.

* * * * *